(12) United States Patent
Seel

(10) Patent No.: US 6,834,705 B2
(45) Date of Patent: Dec. 28, 2004

(54) WINDOW ROLLER BLIND OR PARTITION NET WITH TWO ANGULAR GEARS

(75) Inventor: Holger Seel, Aidlingen (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 10/416,072
(22) PCT Filed: Oct. 11, 2001
(86) PCT No.: PCT/DE01/03909
§ 371 (c)(1), (2), (4) Date: Oct. 10, 2003
(87) PCT Pub. No.: WO02/38404
PCT Pub. Date: May 16, 2002

(65) Prior Publication Data
US 2004/0069424 A1 Apr. 15, 2004

(30) Foreign Application Priority Data
Nov. 10, 2000 (DE) .......................................... 100 55 949

(51) Int. Cl.⁷ ................................................. B60J 3/00
(52) U.S. Cl. ................................ 160/370.22; 296/97.8
(58) Field of Search ........................... 160/370.22, 310, 160/311, 312, 265, 188, 68, 70; 296/97.8, 97.4, 37.16

(56) References Cited

U.S. PATENT DOCUMENTS

| 4,836,263 A | | 6/1989 | Ament |
| 5,076,633 A | * | 12/1991 | Hsu et al. .................. 296/97.4 |
| 5,468,040 A | * | 11/1995 | Peng Hsieh et al. ....... 296/97.4 |
| 5,638,884 A | * | 6/1997 | Lin ........................ 160/370.22 |
| 5,653,278 A | | 8/1997 | Cheng |
| 5,752,560 A | * | 5/1998 | Cherng ................. 160/370.22 |
| 5,896,910 A | * | 4/1999 | Chen ..................... 160/370.22 |
| 6,427,751 B1 | * | 8/2002 | Schlecht et al. ....... 160/370.22 |
| 6,695,381 B2 | * | 2/2004 | Schlecht et al. ........... 296/97.4 |

FOREIGN PATENT DOCUMENTS

| DE | 100 25 401 A1 | 12/2001 |
| EP | 0 240 747 | 10/1987 |
| EP | 0 953 464 A1 | 11/1999 |

* cited by examiner

Primary Examiner—David Purol
(74) Attorney, Agent, or Firm—Leydig, Voit & Mayer, Ltd.

(57) ABSTRACT

A window roller blind (5) or a partition net is provided that is extendable and retractable with the aid of actuating elements (14, 15) that swing about axes that extends at a right angle to a winding shaft (18) on which material (8) is wound up. The actuating elements (14, 15) are stiff relative to a bending plane that extends at a right angle to the planes defined by the spread-out roller blind strip (8) or the partition net. Each of the actuating elements (14, 15) includes an angular gear (22, 23) with an output shaft that carries and rotates with the respective actuating element (14, 15). The output shaft (32, 34) of the respective angular gear (22, 23) forms at the same time the bearing axis of the actuating element (14, 15). The two angular gears (22, 23) are either driven by separate motors (29, 33), or their input shafts are mechanically coupled one with the other and are jointly driven by a single electric motor (29).

9 Claims, 5 Drawing Sheets

WINDOW ROLLER BLIND OR PARTITION NET WITH TWO ANGULAR GEARS

FIELD OF THE INVENTION

The present invention relates generally to window roller blinds or partition nets, and particularly, to roller blinds and partition nets adapted for installation into automobiles.

BACKGROUND OF THE INVENTION

A rear-window roller blind, which operates without any guides, is known from EP 0 240 747. A spring-biased winding shaft of the rear-window roller blind is rotatably seated in a case provided on or below the rear window shelf. The blind strip is mounted on the winding shaft at one of its edges, while its other edge, parallel to the first edge, is connected with a pull rod. The pull rod simultaneously serves to stiffen the respective edge of the blind strip.

For spreading out the blind strip, and keeping it in spread-out condition, two pivot levers are seated in the winding shaft. The free ends of the two rigid pivot levers are in sliding engagement with the pull rod. By pivoting the pivot levers in opposite directions, the blind strip is pulled off the winding shaft and is spread out against the action of a spring. At the same time, the pivot levers carry the respective edge of the blind strip in any operating condition and cooperate with the spring-biased winding shaft to keep the blind strip in spread-out condition.

Pivoting of the levers is effected via a crank gear. The levers are extended for this purpose beyond the pivoting axes, and the extension serves as crank for engagement of a pull rod. The other end of each of the two pull rods is likewise connected with a crank, and these cranks rotate with the output shaft of a gear unit.

With such an arrangement, a geared motor must be arranged approximately midway between the two pivot levers. This, in connection with the crank arms, results in considerable space requirements in an undesirable location of the vehicle, namely in the middle of the luggage compartment below the rear-window shelf.

OBJECTS AND SUMMARY OF THE INVENTION

It is an object of the present invention to provide a window roller blind or partition particularly adapted for installation adjacent a rear window of tin automobile, which has an actuating mechanism that is more compact in design and which does: not substantially interfere with usable space in the vehicle.

Another object is to provide a rear-window roller blind or a partition net as characterized above which has actuating elements driven without the use of any cranks.

In carrying out the invention, whether the device is configured as a rear-window window roller blind or as a partition net, two actuating elements are provided which have one of their ends seated on the output shaft of an angular gear. The angular gear can have smaller dimensions than the cranks so that considerable space savings can be realized. The input shafts of the angular gears extend parallel to the axis of the winding shaft and can be easily coupled by a drive shaft, including a flexible shaft.

Alternatively, each gear unit may be provided with a separate motor. Special synchronization means are not required for such drive motors. For pulling the blind out or drawing it in, it is sufficient if an electric current of corresponding polarity is applied to the two motors simultaneously. The normal synchronism of permanent-field field d.c. motors is adequate to prevent the blind strip from being pulled a wrong direction.

The use of two motors, i.e. one electric motor for each angular gear, further permits the use of motors of smaller rating and, thus, smaller size so that further considerable space savings can be achieved. In addition, it also is possible to accommodate the motor in an offset arrangement A simple and very space-saving form of the angular gear is achieved through use of a worm gear. The worm gear provides the additional advantage that while having small overall dimensions it is capable of transmitting a relatively high torque. Other actuating elements may consist of one-armed levers, or even toggle levers, depending on what is more convenient for the particular application.

Other objects and advantages of the invention will become apparent upon reading the following detailed description and upon reference to the drawings, in which:

Figure 1:
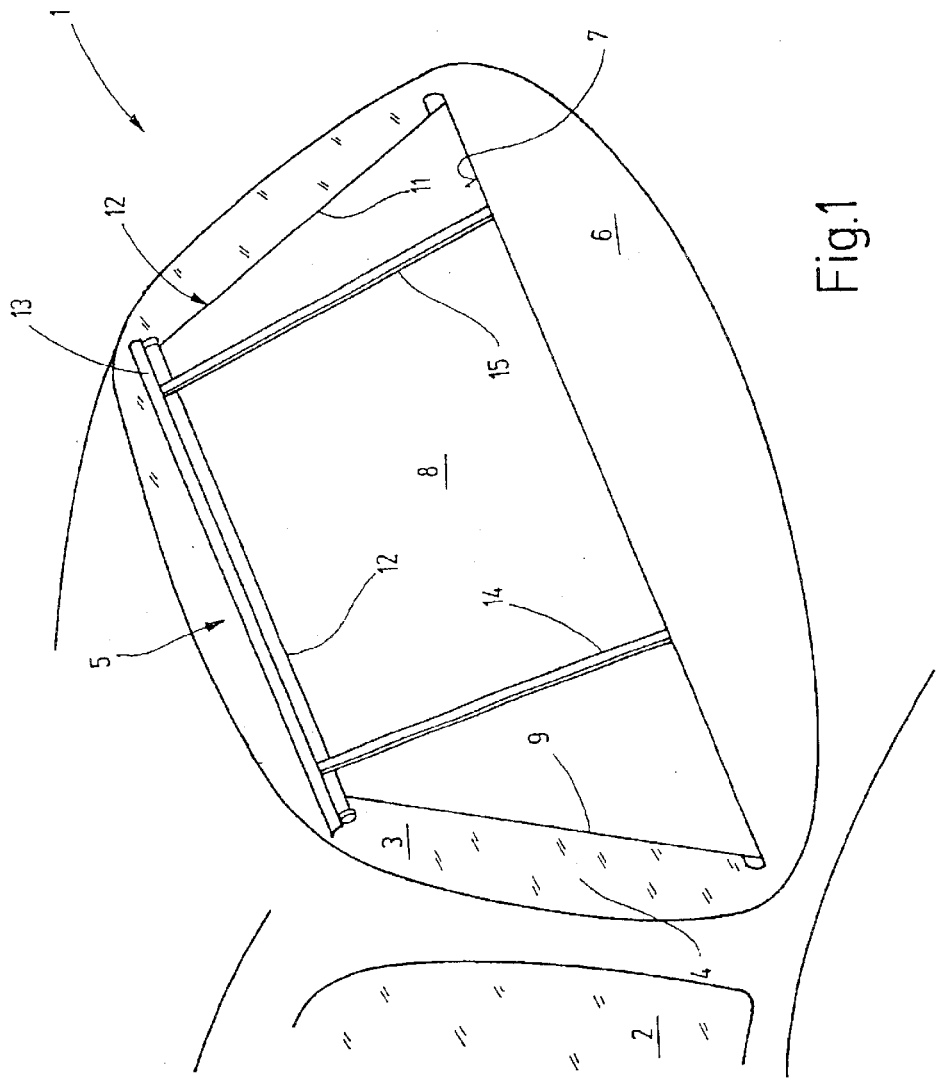
FIG. 1 is a rear perspective of a motor vehicle having a rear window roller blind in accordance with the invention.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

The roller blind 5, as depicted in FIG. 1, comprises a blind strip 8, consisting of a more or less transparent planar material of substantially trapezoidal shape, which is bounded by two longitudinal edges 9 and 11. Mounted on a transverse edge 12, which extends crosswise to the longitudinal edges 9 and 11, is a pull rod 13. The pull rod 13 has a downwardly opening guiding groove which is engaged by the free ends of two pivot levers 14 and 15 that swing in opposite directions. When the rear-window roller blind 5 is pulled out or retracted, the pivot levers 14 and 15 together with the blind strip 8 move out of or into the blind slot 7, respectively.

Figure 2:
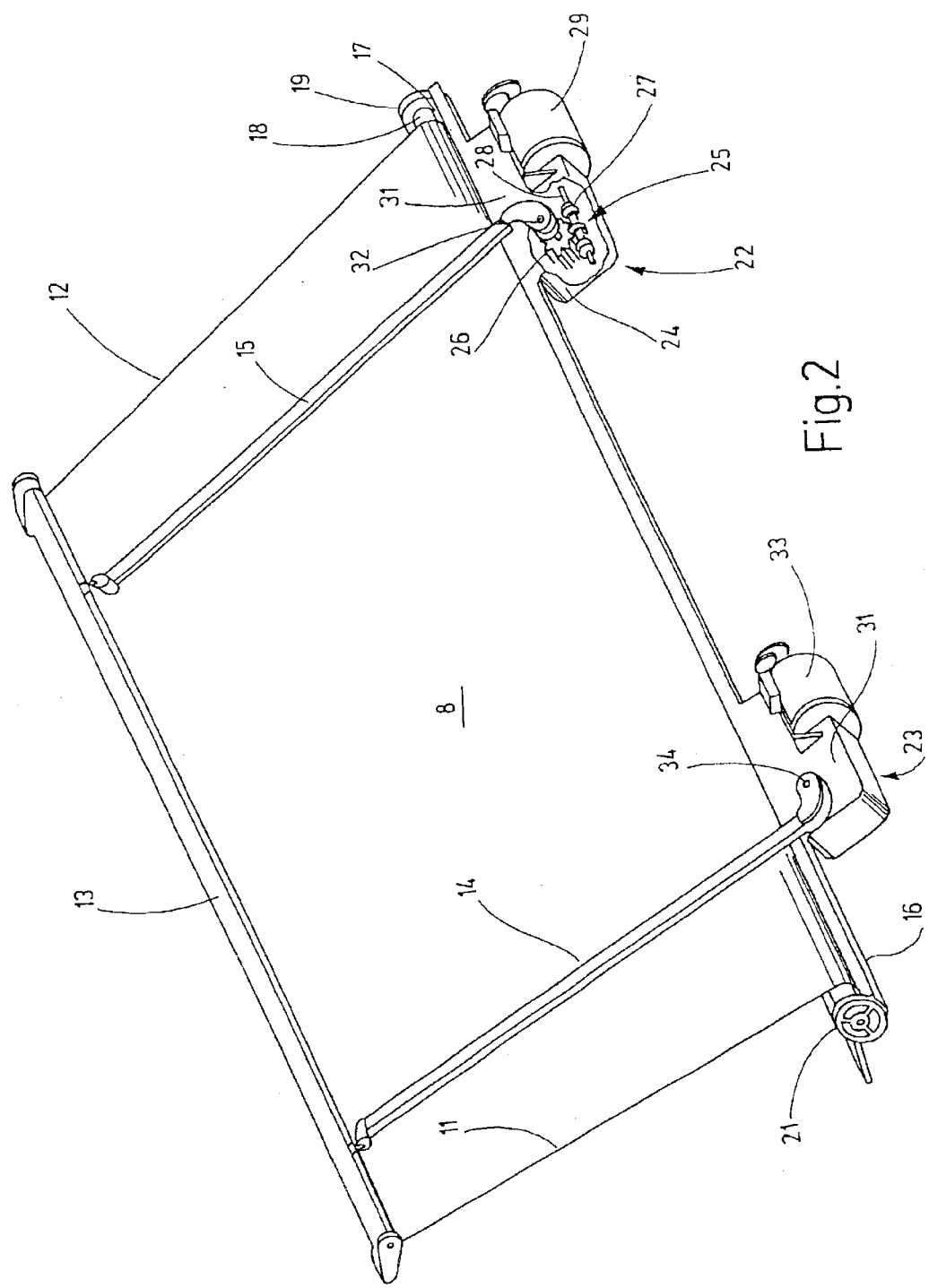
FIG. 2 is an enlarged perspective of the roller blind shown in the motor vehicle depicted in FIG. 1.

As depicted in more detail in FIG. 2, the rear-window roller blind 5 comprises a frame or base 16 with a full-length longitudinal groove 17 in which a winding shaft 18 is rotatably seated. For rotatably supporting the winding shaft 18, bearings 19 and 21 are provided at opposite ends of the groove 17. The blind strip 8 is secured to the winding shaft 18 along a lower transverse edge that extends in parallel to the transverse edge 12. A helical spring is disposed within the tubular winding shaft 18 in a known manner for biasing the winding shaft 18 in a direction in which the blind strip 8 is wound up on the winding shaft 18.

Laterally next to the winding shaft 18, two angular gears 22 and 23 are mounted on the base 16. The angular gear 22 comprises a gear case 24 which houses a worm gear 25 that includes a worm wheel 26 and a worm 27. The rotary axis of the worm wheel 26, which is rotatably seated in the gear case 24, extends at a right angle to the axis of the winding shaft 18, while the worm 27 extends in parallel relation to the winding shaft 18. It will be understood by a person skilled in the art that the worm 27 and worm wheel 26 are supported by appropriate bearings within the gear case 24.

DETAILED DESCRIPTION OF PREFERRED EMBODIMENTS

Referring now more particularly to the drawings, there is shown a passenger car 1 having a rear window 3 with a roller blind 5 in accordance with the present invention. The rear window 3 in this case is formed by a curved window pane 4, and the roller blind 5 is mounted adjacent an inner surface of the window pane 4, being shown in FIG. 1 in a pulled out condition. The passenger car in this case has a rear window shelf 6 provided with a lead-out slot 7 extending substantially the full width of the shelf. The window shelf 7 extends from a lower edge of the rear window to the rear side of the rear back seat in a customary manner. The passenger car in this case further has rear side windows 2.

The worm 27 is mounted for rotation with the drive shaft 28 of a permanent-field d.c. motor 29. The worm wheel 26 is mounted on, and rotates with, an output shaft 32, which extends through the front of the gear case 24 as viewed in FIG. 2. The worm wheel output shaft 32 carries the pivot arm 15, with the output shaft 32 in this case being fixed with a bore in the end of the pivot arm 15. Consequently, the output shaft 32 of the worm wheel 26 simultaneously acts as pivoting axis for the lever 15 and extends at a right angle relative to a plane defined by the spread-out roller blind 8.

The angular gear 23 has the same design as the angular gear 22 and is likewise provided with a separate drive motor 33. Again, a worm wheel axle or shaft 34 projects through the front 31 of the angular gear 23 and carries the pivot lever 14 which is affixed thereto. The two pivot levers 14 and 15 are bent at right angles in opposite directions, as shown in the drawing, so that in the retracted condition they will occupy a parallel position below the slot 7.

The pivot arms 14, 15 are relatively stiff so as to keep the roller blind 8 in spread-out condition when extended. The necessary reaction torque must be provided by the axles 32, 34, and these, as well as their seating elements, therefore are sufficiently robust to withstand the torque occurring on the pivot levers 14, 15 in the extended condition.

It will be appreciated that an advantage of the foregoing arrangement is that the worm wheel 26 requires less space in the radial direction than the crank arrangement of the known rear-window roller blind described above. In addition, the driving power is distributed between two motors so that the diameter of each motor can be smaller because the motor need only provide half of the driving power, as compared with the use of a single motor as in the prior art.

The two motors 29 and 33 preferably are jointly connected to a corresponding control switch or other control means for the rear-window roller blind 5. They can be switched on simultaneously and switched off simultaneously. During the time they are running, no separate synchronization is effected between the two motors 29 and 33. The only synchronization that occurs in operation of the two motors 29 and 33 is that the movement of the pivot arms 14 and 15 is blocked in their retracted end positions, which serves as a common limit stop.

The operation of the illustrated roller blind 5 is as follows:

In the retracted condition, the blind strip 18 is wound up on the winding shaft under the action of a helical spring located inside the winding shaft 18 with the helical spring acting as a spring motor. The pull rod 13 rests on the edges of the slot 7 and largely covers the slot in the retracted condition. The two arms 14 and 15 have been swung into a position in which they extend in parallel relation to the winding shaft 18.

For guiding pivotal movement of the pivot levers 14 and 15 relative to the pull rod during extension and retraction, depending on the ratio of the distance between the two axles 32 and 34 and the length of the pivot levers 14 and 15, it may be desirable to provide a common groove in the pull rod for guiding pivotal movement of both pivot levers 14 and 15, or separate parallel guide grooves each for an individual pivot lever. A single guiding groove may be used if the distance between the two axles 33 and 34 is longer than the sum of the lengths of the two pivot levers 14 and 15. On the other hand, when that sum is less than the distance, then the pivot levers 14 and 15 would strike each other in a common groove so in that case it would be desirable to provide a separate groove for each of the two levers 14 and 15.

In the retracted position, the two pivot arms 14 and 15 further may abut against stationary stops that can be provided on the base 16 at a location before the arms free of the respective guiding groove of the pull rod 13. Alternatively, a mechanical stop can be defined by an undercut groove for the levers 14 or 15 so that the pull rod 13 is pulled against the lead-out slot by the swinging force of the pivot arms 14, 15. In this case, the respective mechanical stop is formed by the mechanical contact between the pull rod and the edges of the lead-out slot 17.

If, starting out from such retracted position, the rear-window roller blind 5 is to be extended, the current with the corresponding polarity is switched on for both motors 29 and 33 simultaneously. Given the fact that the motors run practically at the same speed, with little variance, they will set the worm wheel 26 into rotation via the worm 27 at almost identical speed so that the respective output shafts 32 and 34 will similarly be rotated at approximately the same speed. Since the two pivot arms 14, 15 are connected to, and rotate with the respective shafts 32, 34, the pivot arms 14, 15 will be moved from the position, in which they extend substantially parallel to the winding shaft 18, to their upright positions shown in FIG. 2. In their upright positions, the two pivot levers 14, 15 extend at an approximately right angle to the winding shaft 18. On their way to that position, the two pivot levers 14 and 15 move through practically the same angular range, though in opposite directions, and reach their extended positions after almost the same time. Since the motor current remains switched on for a longer period of time, it is assured that each pivot arm 14, 15 actually reaches its end position defined by appropriate corresponding stops, such as simple pins provided on the base 16.

In the illustrated embodiment, the two angular gears 22 and 23 are spaced apart one from the other so that in the extended condition the pivot arms 14, 15 extend in parallel relation one to the other in their end positions. In such case, the pivot arms 14, 15 extend over the surface of the blind strip 8 in their extended condition. Alternatively, the location of the gear units 22 and 23 could be shifted outwardly such that when the pivot levers 14, 15 are in their extended positions they are parallel to the lateral edges 9 and 11 of the blind strip.

Figure 3:
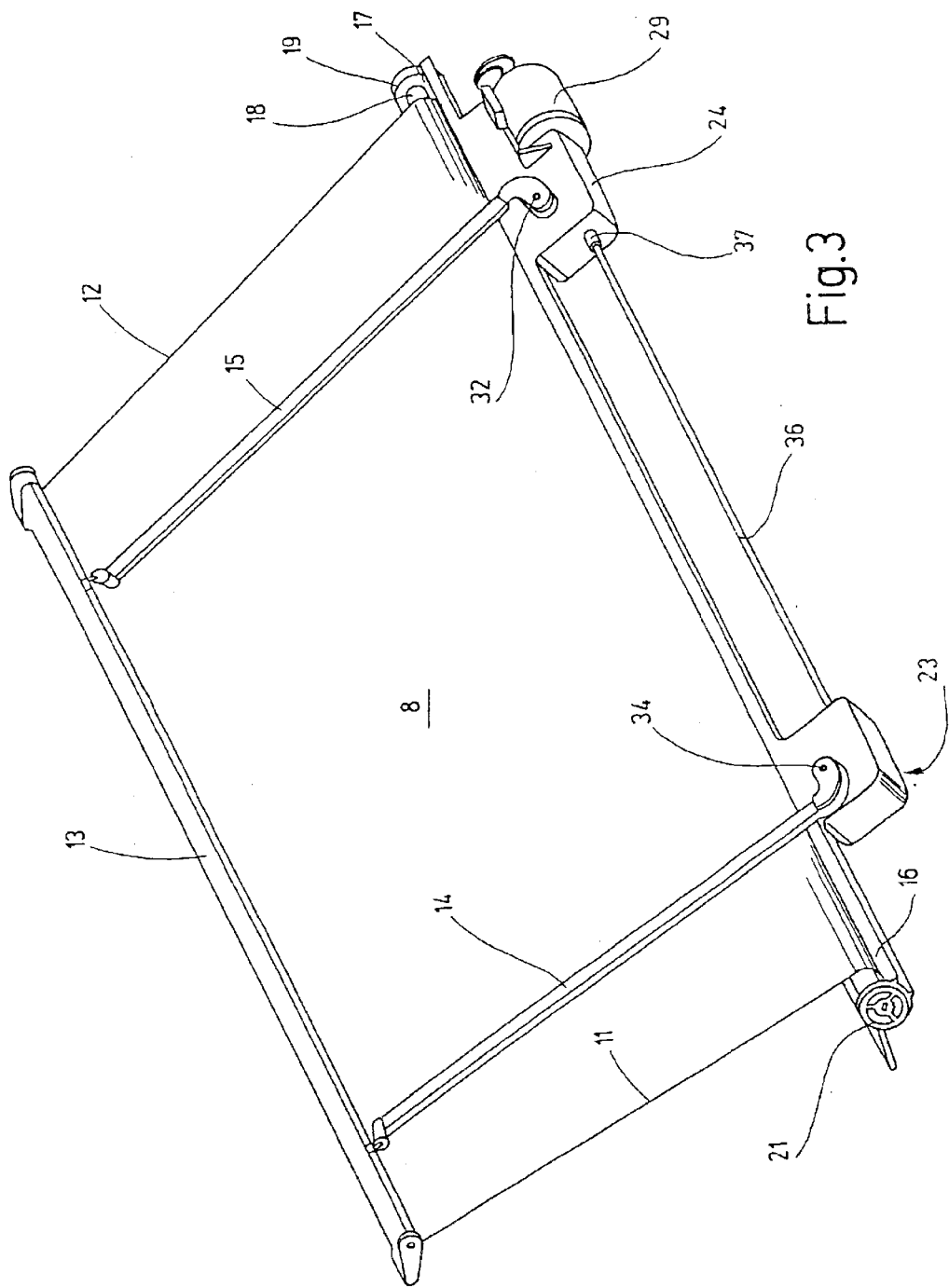
FIG. 3 is a perspective of an alternative embodiment of rear window roller blind in accordance with the invention which has a single drive motor and a coupling shaft.

Another space-saving embodiment is illustrated in FIG. 3. In this case, a coupling shaft 36 is used instead of the second motor 33. Structural elements of the rear-window roller blind 5 described in connection with FIG. 2 have been designated hereafter by the same reference numerals and their description will not be repeated. The coupling shaft 36 in this case has one of its ends connected for rotation with the axle stub 37 of the worm shaft 28 which projects from the gear case 24. The other end of the coupling shaft 36 is connected for rotation with the worm shaft of the angular gear 23.

This arrangement also is relatively space-saving although a single motor must provide the entire drive power. Space saving nevertheless is achieved because the drive motor can be shifted to one end of the base 16 and when in the installed condition, it projects in downward direction as to be less disturbing. It will be understood that in the embodiment of FIG. 3 the two angular gears 22, 23 are equipped with worms which have an opposite direction of rotation in order to attain the contrary movement of the two pivot arms 14, 15, which in the embodiment of FIG. 2 is accomplished by the opposite polarity of the motors 29 and 33.

Figure 4:
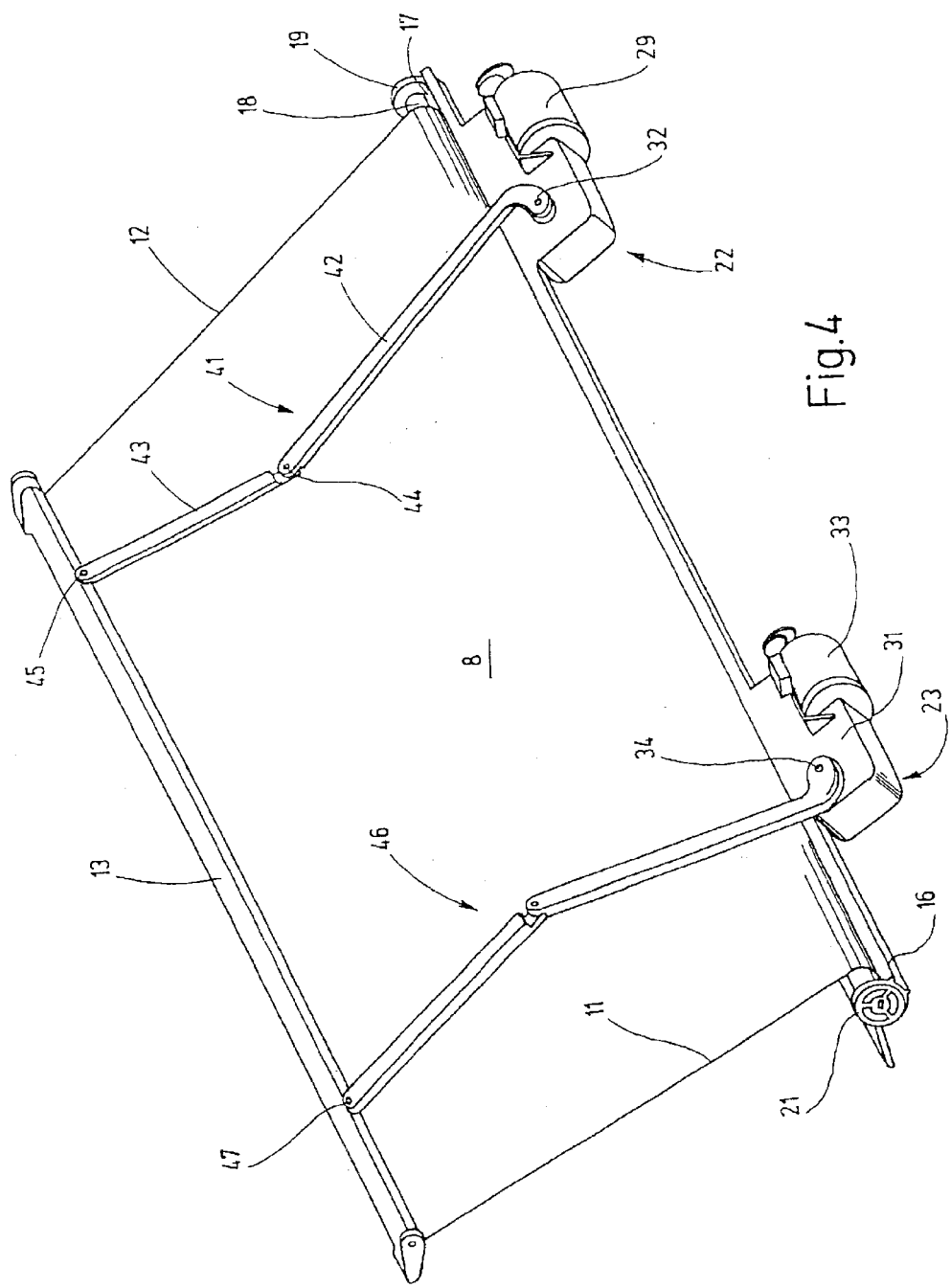
FIG. 4 is a perspective of a rear window roller blind, similar to that shown in FIG. 2, which utilizes toggle lever actuating elements.

FIG. 4 shows an alternative embodiment that differs from the embodiment of FIG. 2 with respect to the actuating elements for the blind strip 8. To the extent any structural elements of that rear-window roller blind 5 have been described before in connection with FIG. 2, they also have been designated hereafter by the same reference numeral, and need not be described again. In this case, a toggle lever 41, consisting of two toggle lever arms 42 and 43, is coupled with the output shaft 32. The two toggle lever arms 42 and 43, which have identical effective lengths, are interconnected by a toggle lever joint 44. One end of the toggle lever arm 42 is mounted for rotation with the output shaft 32 and is connected to the toggle lever joint 44 whose joint axis extends in parallel relation to the axis 32. The second toggle lever arm 32 connects between the toggle lever joint 44 and an articulation joint 45 on the pull rod 13. The axis of that joint 45 again is parallel to the axis 32.

Similarly, the pivot arm 14 of the embodiment of FIG. 2 has been replaced by a toggle lever, namely toggle lever 46, whose structure is identical to that of the toggle lever 42. One end of the toggle lever is connected for rotation with the shaft 34, while its other end is pivotally connected with an articulation point 47 on the pull rod 13. Hence, the axes of the articulation points 45, 47 and the shafts 32, 34 form the corners of a rectangle. In operation, as the two toggle levers 41 and 46 fold together, the toggle lever joints 44 move one toward the other. The drive for the two toggle levers 41 and 46 may be configured in the way illustrated in FIG. 2 or in FIG. 3.

Figure 5:
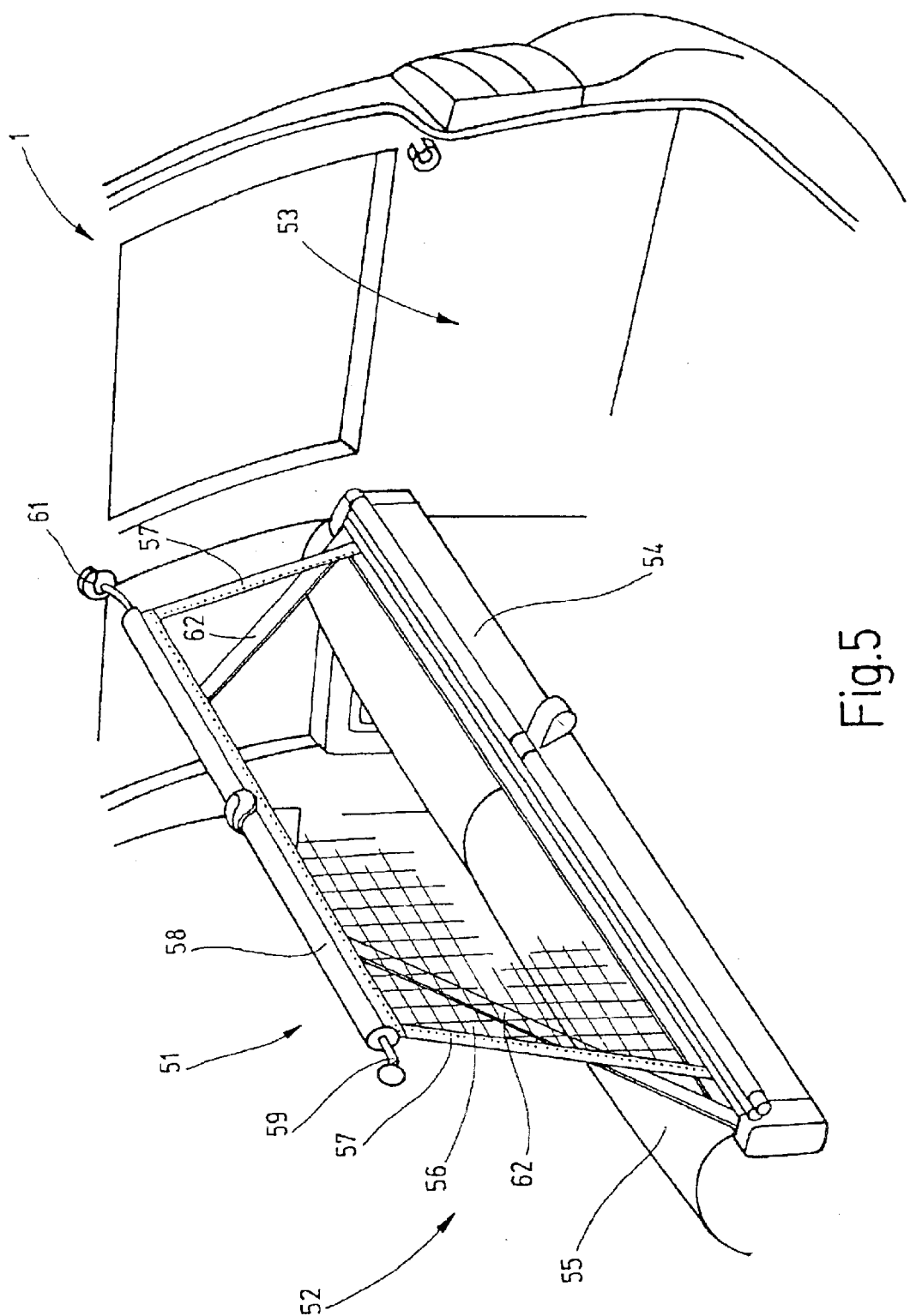
FIG. 5 is a rear fragmentary perspective of a station wagon having a partition net in accordance with the invention.

The driving system of the invention, as illustrated in connection with the rear-window roller blind 5, also can be used for electrically extending and retracting partition nets 51, as illustrated in FIG. 5, which serves to separate a passenger compartment 52 from a cargo compartment 53 of a station wagon 1. The partition net 51 in this case has an oblong case 54, which is mounted on the rear surface of a backrest 55 and extends over the full vehicle width. A winding shaft similar to the winding shaft 18 of the rear-window roller blind 5 is rotatably mounted inside the case 54. Fixed at one end to the winding shaft is a knitted mesh fabric 56 which may be made of plastic threads that have been processed into a warp-knitted fabric. The illustrated mesh fabric 56 has an approximately trapezoidal shape with lateral edges are secured by bordering strips 57.

A pull rod 58, provided with hook-up means 59 on one of its ends, is mounted on the mesh structure 56 at an edge of the case 54 spaced from the winding shaft and the case 54. The hook-up means 59 are adapted for mounting in receiving pockets 51 in the vehicle.

For spreading out the mesh structure 56, there are provided two levers 62, which are pivotable in opposite directions and which are connected and actuated in the same way as the pivot arms 14 and 15 of the illustrated embodiments for the rear-window roller blind 5 depicted in FIG. 2 or 3. Accordingly, there is no need here to repeat the description of FIG. 2 or 3, which differs only by the pivot levers being designated by reference numeral 62 and the blind strip 8 being the mesh structure 56.

From the foregoing, it can be seen that roller blind 5 or a partition net 51 according to the invention is extendable with the aid of actuating elements 14, 15, 41, 46, 62, the actuating elements 14, 15, 41, 46, 62 pivoting about an axis that extends at a right angle relative to the winding shaft 18 on which the respective strips 8, 56 are wound up. The actuating elements 14, 15, 41, 46, 62 are relatively stiff with respect to a bending plane that extends at a right angle to the planes defined by the spread-out blind strip 8, 56 or the partition net. For each of the actuating elements 14, 15, 41, 46, 62, an angular gear 22, 23 is provided, whose output shaft carries, and rotates with, the respective actuating element 14, 15, 41, 46, 62. The output shaft 32, 34 of the respective angular gear 22, 23 forms at the same time the bearing axis for the respective actuating element 14, 15, 41, 46, 62. The two angular gears 22, 23 are either driven by separate motors 29, 33, or else their input shafts are mechanically coupled one to the other and are jointly driven by a single electric motor 29.

What is claimed is:

1. A window roller blind or partition net apparatus (5, 51) comprising: a rotatably mounted winding shaft (18); a strip of material (8, 56) having one edge fastened to the winding shaft and an opposite edge which is stiffened by a pull rod (13, 58) affixed thereto; two angular gears (22, 23) arranged adjacent said winding shaft (18); each said angular gear (22, 23) including an input shaft (28) and an output shaft (32, 34); said input shaft (28) of each said angular gear (22, 23) extending in parallel relation to said winding shaft (18); said output shafts (32, 34) extending at a right angle to said winding shaft (18); two actuating elements (14, 15, 41, 46, 62); said actuating elements being connected at one end to said pull rod (13, 58) and each being mounted at an opposite end on one of said output shafts (32, 34); said actuating elements being operable for pulling the strip (8, 56) from the winding shaft (18) as an incident to rotation of said output shafts and for maintaining the strip (8, 56) in spread-out condition over at least a part of the pull-out distance; and a drive (29, 33) coupled to the input shafts (28) of the gear units (22, 23) for rotating said input shafts (28), and in turn, said output shafts (32, 34).

2. The apparatus of claim 1 in which said winding shaft (18) has an associated spring for biasing the winding shaft (18) in a direction for winding the strip (8, 56) onto the winding shaft (18).

3. The apparatus of claim 1 in which each said angular gear (22, 23) is a worm gear having a worm wheel (26) connected for rotation with the output shaft (32, 34) of the respective angular gear (22, 23).

4. The apparatus of claim 1 in which each said angular gear (22, 23) is a worm gear having a worm (27) connected for rotation with a respective input shaft (28) of the angular gear (22, 23).

5. The apparatus of claim 1 in which said input shaft (28) of one angular gear (22) has a drive end and a driven end (37), an electric motor (29) coupled for rotation with the drive end (37) of the one angular gear (22) and the other angular gear (23) includes at least one drive end which is coupled to the driven end (37) of the input shaft of the one angular gear (23).

6. The apparatus of claim 5 in which the drive end of the other angular gear (23) is coupled to the driven end (37) of the input shaft (28) of the one angular gear (23) by a connecting shaft (36).

7. The apparatus of claim 1 in which the input shaft (28) of each angular gear (22, 23) is coupled with a separate electric motor (29, 33).

8. The apparatus of claim 1 in which each of the actuating elements (14, 15, 41, 46, 62) is formed by a toggle lever (41, 46), each toggle lever (41, 46) including two toggle lever arms (42, 43) that are interconnected by a toggle lever joint (44).

9. The apparatus of claim 1 in which each of the actuating elements (14, 15, 41, 46, 62) is formed by a one-armed lever.

* * * * *